J. S. HARBISON.
Bee Hive.

No. 22,500.

2 Sheets—Sheet 1.

Patented Jan'y 4, 1859.

Witnesses
S. H. Wales
M. S. Buckley

Inventor
John S. Harbison

J. S. HARBISON.
Bee Hive.
No. 22,500.
2 Sheets—Sheet 2.
Patented Jan'y 4, 1859.
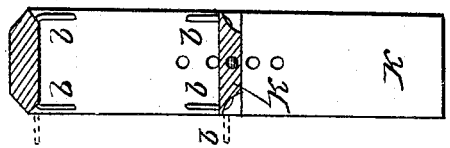
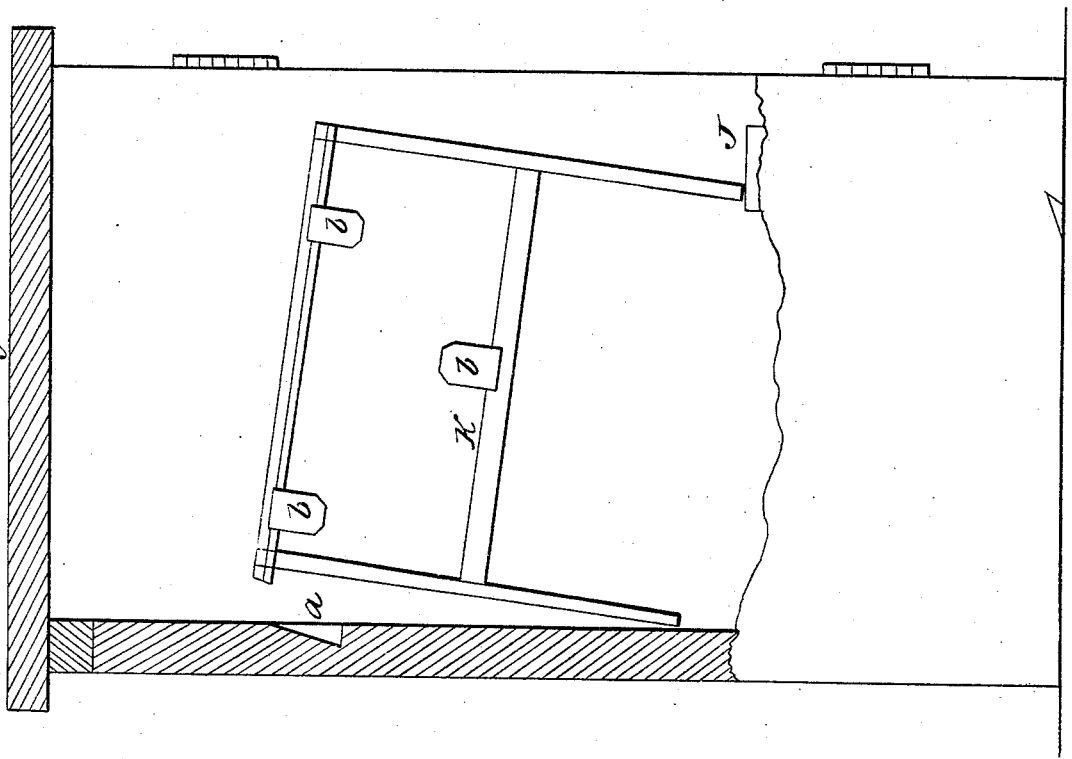
Witnesses
S H Wales
Th Buckly
Inventor
John S Harbison

UNITED STATES PATENT OFFICE.

JNO. S. HARBISON, OF SACRAMENTO, CALIFORNIA.

BEEHIVE.

Specification forming part of Letters Patent No. 22,500, dated January 4, 1859; Reissued September 3, 1861, No. 1,225.

*To all whom it may concern:*

Be it known that I, JOHN S. HARBISON, of the city and county of Sacramento and State of California, have invented certain new and useful Improvements in Beehives, of which the following is a full, clear, and exact description, reference being had to the accompanying drawings, forming a part of this specification, in which—

Figure 2:
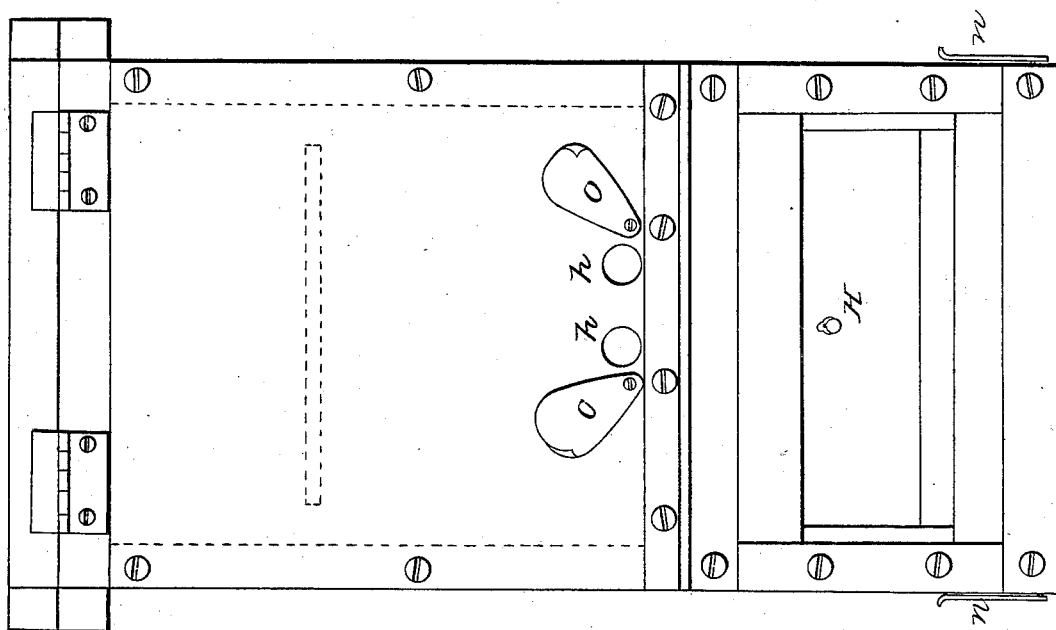
Figure 1:
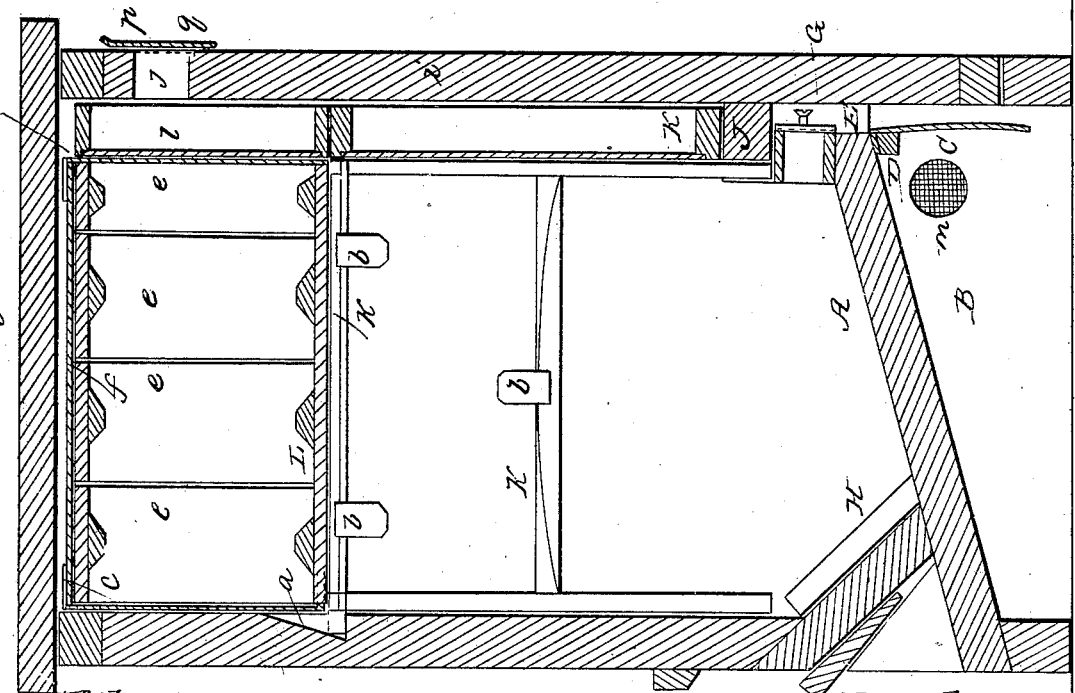

Figure 1, represents a longitudinal section of my bee hive. Fig. 2, a front elevation of the same. Fig. 3, a longitudinal section illustrating the sectional comb frame when being removed from the hive. Fig. 4, a vertical section of the sectional comb frame.

Similar letters of reference, in each of the several figures indicate corresponding parts.

The nature of my invention consists, 1st, in the graduating chamber in combination with the curtain, and ventilating passages; whereby air is admitted without light into the hive, arranged in the manner and for the purpose hereinafter described. 2nd, providing the adjustable sectional comb frames K, with the flexible metal clamps $b$, $b$, when the frames are constructed and arranged in the manner described, for the purpose specified. 3rd, the device composed of the parts in combination with a horizontal tier of boxes, arranged as described.

To enable others skilled in the art, to make and use my invention, I will proceed to describe its construction and operation.

A, is the inclined bottom board of the filth chamber, it is elevated above the bottom of the hive so as to form a chamber by means of which the admission of air and light is graduated according to the requirement of the bees at different seasons of the year.

B, is the graduating chamber for the admission of air and light into the hive.

C, is a curtain which can be raised to admit more or less light as may be required and when lowered serves for throwing a shade about the air space, thereby preventing the entrance of light into the working chamber without interfering with the ventilation of the same, and which serves to keep the bees in a state of repose a greater part of the time when unable to collect honey or during windy and cold weather at any season. Again by the exclusion of light the bees are kept in a state of repose and consequently a less amount of food is necessary for their sustenance, which greatly lessens the consumption of their winter stores, thereby saving great numbers of bees from perishing for want of food; also the ravages of neighboring bees is effectually stopped by the exclusion of light.

I, is the cross piece to which the curtain is attached; it is secured to the inclined bottom board A, at such a distance from the door as to allow space for the admission of air and light to the hive.

E, is the passage for the admission of air and light to the hive.

F, is a movable cross piece provided with two wire screens G, G, for the purpose of admitting the air and light, which ascend through the passage E; G, G, wire screens secured to the movable perforated cross piece F; H, an adjustable slide which fits loosely in grooves on the sides of the hive and provided with a wedge I; for the purpose of tightening or loosening the same, said slide H, being removed to admit the discharge of any impurities which may have collected on the inclined bottom board A.

J, is a cross piece mortised to admit the lower ends of the sectional comb frames; K, one of the sectional comb frames having a tenon cut on its lower end which fits into the mortise cut in the cross piece J, also having a projection on its upper part which fits into a slot $a$, cut on the inner part of the front of the hive; by this means it is secured in its rightful position in the hive; the lower part of said sectional comb frame K being adjustable up and down by means of holes and pins, for adjusting it to the different sized combs. By removing the honey boxes and bearing on the upper end of the sectional comb frame K, it is elevated (as shown in Fig. 3) which throws the projection on the upper end of the sectional comb frame K, out of the slot $a$, and enables the apiarian to remove or replace it with ease and facility without molesting the other bees or in any way injuring the combs in the adjoining frames. The sectional comb frame K, is provided with six or more flexible metal clamps $b$, $b$, $b$, secured to its upper and lower ends, said clamps serve to retain the comb in the sectional comb frame; raising the flexible metal clamps $b$, $b$, $b$, on one side of the frame enables the apiarian to remove or replace a comb with facility and despatch.

L, is the platform supporting the honey boxes and resting on the tops of the sectional comb frames K, of such a width as to allow a passage for the bees to the honey boxes (as shown in dotted lines Fig. 2.) Said platform L, is provided with a flexible back angular clamp $c$, and a flexible front angular hinged clamp $d$, both of which serve to brace the honey boxes; $e, e, e$, are the honey boxes resting on the platform L.

$f$, is the upper coupling strap fitting under the angles of the flexible angular clamps $c$, and $d$, which completes the bracing of the honey boxes. By removing the coupling strap $f$, and folding down the flexible angular hinged clamp $d$, the honey boxes may be removed separately and by folding the flexible angular hinged clamp $d$, to its former position and replacing the coupling strap $f$, the honey boxes may all be removed at once, thus affording great ease and facility for reaching the sectional comb frames K; $g, g$, apertures provided with wire screens $m, m$, and movable covers $n, n$, for the admission of air and light to the graduating chamber B.

$h, h$, are the openings provided with movable covers $o, o$, for the ingress and egress of the bees.

$i$, is the door of the hive provided with an opening $j$, said opening being furnished with a wire screen $p$, and movable cover $q$, which serves to admit air and light to the upper part of the hive.

$k$, is a glass frame resting on the cross piece J, and inclosing the sectional comb frame K; $l$ glass frame resting on the glass frame $k$, and inclosing the honey boxes $e, e, e$.

What I claim as my invention and desire to secure by Letters Patent, is—

1. The graduating chamber B, in combination with the curtain C, and ventilating passages E, and F, whereby air is admitted without light into the hive, arranged substantially as and for the purpose herein described.

2. Providing the adjustable sectional comb-frames K, with the flexible metal clamps $b, b$, when the frames are constructed and arranged in the manner described for the purposes specified.

While not claiming broadly the removal of a tier of boxes at one operation; nor the boxes of a tier separately, by means of a clamp irrespective of the mode of construction, I do claim—

3. The device composed of the parts L, $f, d, c$, in combination with a horizontal tier of boxes arranged and operated as and for the purposes described.

The above specification of my improvement in bee hives signed by me this 18th day of October 1858.

JOHN S. HARBISON.

Witnesses:
   G. YORKE ATLEE,
   EDM. F. BROWN.

[FIRST PRINTED 1911.]